United States Patent [19]

Merkel

[11] Patent Number: 5,922,297
[45] Date of Patent: Jul. 13, 1999

[54] SILICOPHOSPHATE COMPOUNDS AND METHOD OF MAKING SAME

[75] Inventor: Gregory A. Merkel, Big Flats, N.Y.

[73] Assignee: Corning Incorporated, Corning, N.Y.

[21] Appl. No.: 08/953,447

[22] Filed: Oct. 17, 1997

[51] Int. Cl.$^6$ ............ C01B 13/00; C01B 25/00; C01B 33/00; C01F 17/00
[52] U.S. Cl. ............ 423/306; 423/263; 502/208; 502/209; 502/210; 502/213; 502/214
[58] Field of Search ............ 423/263, 306; 502/208, 209, 210, 213, 214

[56] References Cited

U.S. PATENT DOCUMENTS

| | | | |
|---|---|---|---|
| 4,925,816 | 5/1990 | Watanabe et al. | 423/306 |
| 4,973,460 | 11/1990 | Flanigen et al. | 423/306 |
| 5,420,091 | 5/1995 | Kuroda et al. | 502/214 |

FOREIGN PATENT DOCUMENTS

| | | | |
|---|---|---|---|
| 311334 | 4/1989 | European Pat. Off. | 502/213 |
| 417723 | 3/1991 | European Pat. Off. | 502/214 |
| 1401012 | 6/1988 | U.S.S.R. | 423/306 |

OTHER PUBLICATIONS

"Silicophosphates with an intersecting tunnel structure: $AM_3P_6Si_2O_{25}$", Materials Chemistry and Physics, 12 (1985) 537–543; No Month.

Primary Examiner—Steven Bos
Attorney, Agent, or Firm—L. Rita Herzfeld

[57] ABSTRACT

A compound having the general formula $AM_{1+y}^{3+}M_{2-2y}^{4+}M_y^{5+}Si_2P_6O_{25}$, wherein A can be K, Rb, or Cs, $M^{3+}$ can be Al, Ga, Cr, Fe, Sc, In, Y, lanthanide series elements, or combinations of these, $M^{4+}$ can be Si, Ge, Ti, Ir, Ru, Sn, Hf, Zr, or combinations of these, $M^{5+}$ can be V, Nb, Ta, or combinations of these, $0 \leq y \leq 1$, the mean ionic radius of the $M^{3+}$ cations and the mean ionic radius of the $M^{5+}$ cations are each about 0.4 to 1.00 Å when coordinated by six oxygen anions, and the mean ionic radii of the $M^{4+}$ cations and the $M^{5+}$ cations are each no greater than about 0.53+(0.30×the mean ionic radius of the $M^{3+}$ cations). The compound can be made by a dry powder method that involves providing a homogeneous powder mixture of raw materials to form the compound, shaping the mixture into a preform, and firing the preform at a sufficient temperature and for a sufficient time to form the product compound. The compound can be made by a sol gel method that involves providing the raw materials in solution form, drying the solution to obtain a sol gel powder, calcining, pulverizing, and shaping the sol gel powder, followed by firing.

23 Claims, 6 Drawing Sheets

POWDER X-RAY DIFFRACTION PATTERN FOR EXAMPLE 1c FIRED AT 1100°C FOR 96 HOURS

Figure 2. Percent linear expansion of $KYZr_2Si_2P_6O_{25}$ ceramic sintered at 1100°C for 96 hours in air (Example 1c).

Figure 3. Percent linear expansion of $KInZr_2Si_2P_6O_{25}$ ceramic sintered at 1100°C for 10 hours in air (Example 5).

POWDER X-RAY DIFFRACTION PATTERN FOR EXAMPLE 6 FIRED AT 1100°C FOR 8 HOURS

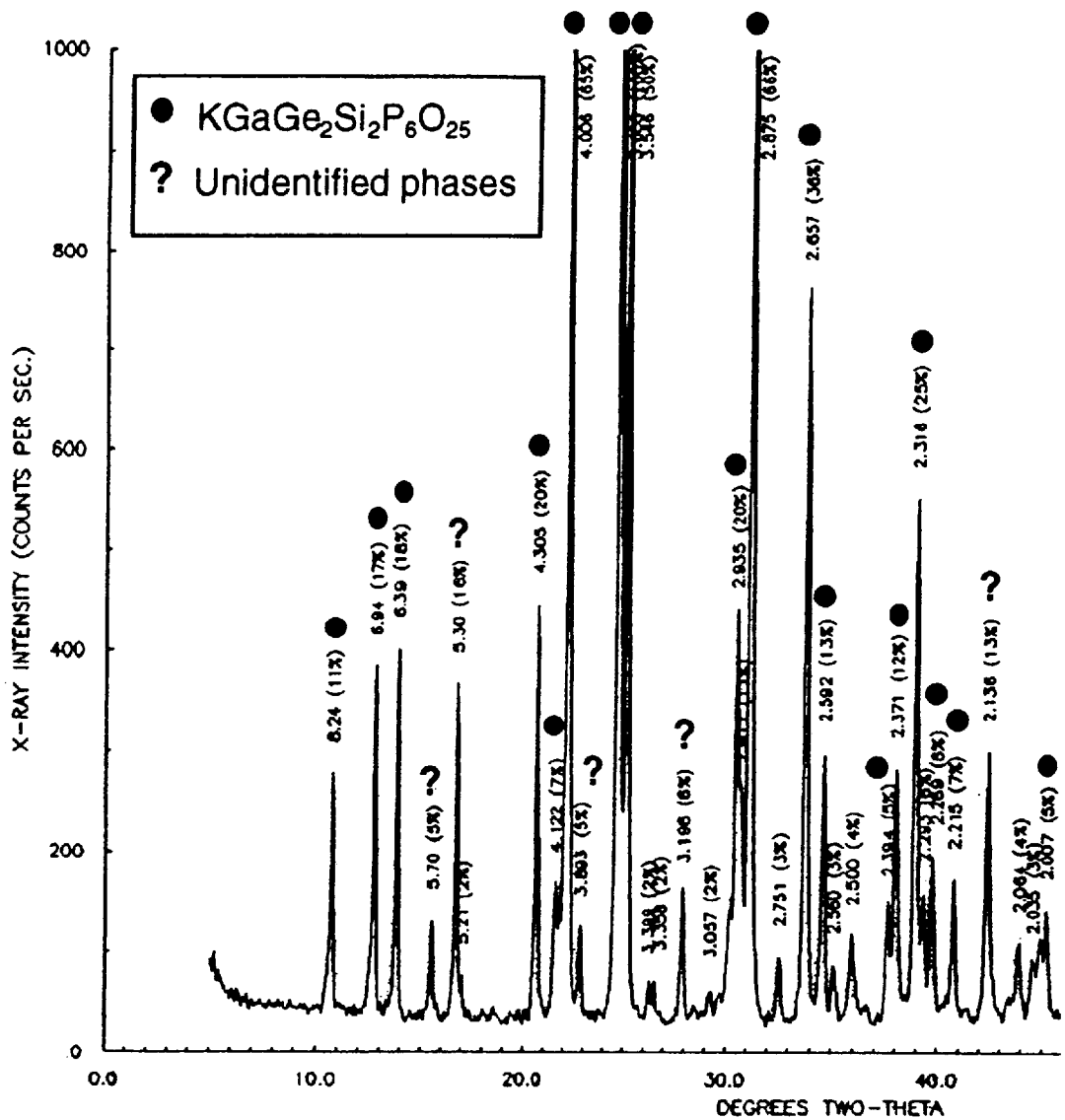
Figure 5. Powder x-ray diffraction pattern for Example 13 fired at 1000°C for 10 hours.

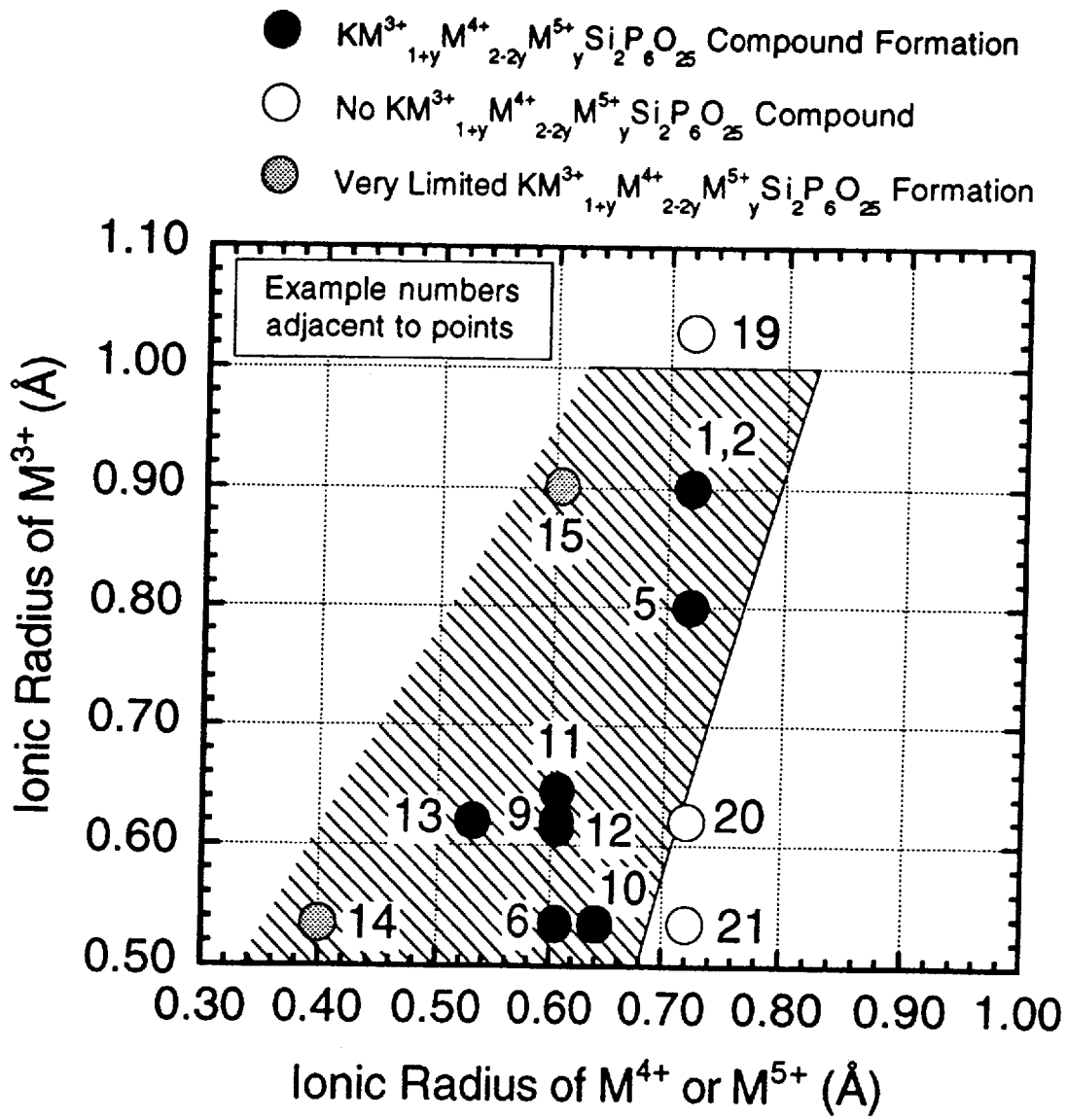
Figure 6. Range of ionic radii of $M^{3+}$, $M^{4+}$, and $M^{5+}$ cations which form $AM^{3+}_{1+y}M^{4+}_{2-2y}M^{5+}_{y}Si_2P_6O_{25}$ type compounds.

SILICOPHOSPHATE COMPOUNDS AND METHOD OF MAKING SAME

This application claims the benefit of U.S. Provisional Application No. 60/029,300, filed Oct. 28, 1996, entitled "Silicophosphate Compounds and Method of Making Same", by Gregory A. Merkel.

This invention relates to new silicophosphate compounds some of which have low thermal expansion at high temperatures. The compounds have the general formula $AM_{1+y}^{3+}M_{2-2y}^{4+}M_y^{5+}Si_2P_6O_{25}$, wherein A is an alkali metal, and $M^{3+}$, $M^{4+}$ and $M^{5+}$ are cations that are used in combinations that result in specific ionic radius characteristics. One especially useful compound having low thermal expansion is $AYZr_2Si_2P_6O_{25}$, with A being most preferably K.

BACKGROUND OF THE INVENTION

Thermally shock resistant materials having low thermal expansion find use in applications in which it is critical to maintain product dimensions, especially for example during high temperature cycling as in automotive catalytic applications.

Crystalline compounds having low thermal expansion frequently contain a high proportion of cations with high valences coordinated by a small number of oxygen anions. Thus, low expansions are more likely to be associated with substances with a large fraction of tetrahedrally coordinated cations having valences of $\geq 4+$, a lesser fraction of octahedrally coordinated cations with valences of $\geq 3+$, and a minimum of highly coordinated (eight or more oxygens) cations with valences of $\leq 2+$. Some silicophosphates having the general formula $AM^{3+}M_2^{4+}Si_2P_6O_{25}$, where A=K, Rb, Tl, Cs, $M^{3+}$=Mo or Ti, and $M^{4+}$=Mo, Ti, or Sn, fall into this category. Such are described in an article entitled "Silicophosphates with an intersecting tunnel structure: $AM_3P_6Si_2O_{25}$ and $AMo_3P_{5.8}Si_2O_{25}$", Materials Chemistry and Physics, 12 (1985) 537–543. There is a high fraction of tetrahedrally coordinated $Si^{4+}$ and $P^{5+}$, an intermediate fraction of octahedrally coordinated $M^{3+}$ and $M^{4+}$ and a small fraction of highly coordinated $A^{1+}$. Because of the unusually low valences of the Mo and Ti cations in these Mo, Ti, and Sn based materials, (stable valence of Mo is 6+, and stable valence of Ti is 4+, in air), they must be synthesized in glass ampoules from a stoichiometric mixture of the oxides plus metal, and are unstable in air. Thus, their potential application is severely limited.

It would be advantageous to have silicophosphates that are stable in air and especially advantageous to have such materials have low thermal expansion at high temperatures. The present invention provides such materials.

SUMMARY OF THE INVENTION

In accordance with one aspect of the invention, there is provided a compound having the general formula $AM_{1+y}^{3+}M_{2-2y}^{4+}M_y^{5+}Si_2P_6O_{25}$, wherein A can be K, Rb, or Cs, $M^{3+}$ can be Al, Ga, Cr, Fe, Sc, In, Y, lanthanide series elements, or combinations of these, $M^{4+}$ can be Si, Ge, Ti, Ir, Ru, Sn, Hf, Zr, or combinations of these, $M^{5+}$ can be V, Nb, Ta, or combinations of these, $0 \leq y \leq 1$ the mean ionic radius of the $M^{3+}$ cations and the mean ionic radius of the $M^{5+}$ cations are each about 0.4 to 1.00 Å when coordinated by six oxygen anions, and the mean ionic radii of the $M^{4+}$ cations and the $M^{5+}$ cations are each no greater than about 0.53+(0.30×the mean ionic radius of the $M^{3+}$ cations).

In accordance with another aspect of the invention, the compound can be made by a dry powder method that involves providing a homogeneous powder mixture of raw materials to form the compound, shaping the mixture into a preform, and firing the preform at a sufficient temperature and for a sufficient time to form the product compound.

In accordance with another aspect of the invention, the compound can be made by a sol gel method that involves providing the raw materials in solution form, drying the solution to obtain a sol gel powder, calcining, pulverizing, and shaping the sol gel powder, followed by firing.

BRIEF DESCRIPTION OF THE DRAWINGS

FIG. 5 is a powder x-ray diffraction pattern for $KGaGe_2Si_2P_6O_{25}$.

FIG. 6 is a plot of range of ionic radii of $M^{+3}$, $M^{+4}$, and $M^{+5}$ cations which form $AM_{1+y}^{3+}M_{2-2y}^{4+}M_y^{5+}Si_2P_6O_{25}$ type compounds.

DETAILED DESCRIPTION OF THE INVENTION

Figure 1:
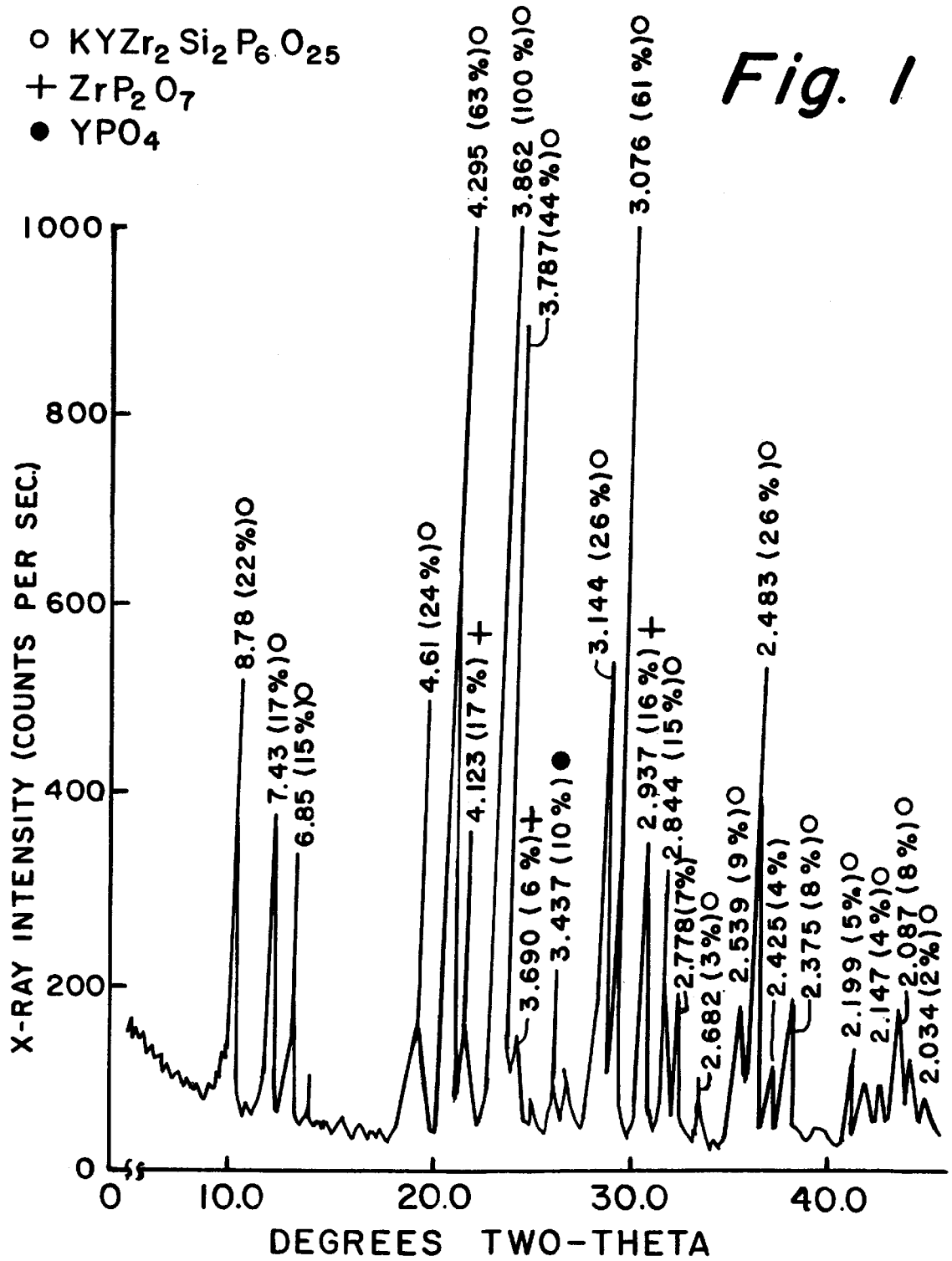
FIG. 1 is a powder x-ray diffraction pattern for $KYZr_2Si_2P_6O_{25}$.

The present invention relates to a compound having the general formula $AM_{1+y}^{3+}M_{2-2y}^{4+}M_y^{5+}Si_2P_6O_{25}$, wherein A is K, Rb, or Cs, and preferably K, $M^{3+}$ can be Al, Ga, Cr, Fe, Sc, In, Y, lanthanide series elements, or combinations of these, $M^{4+}$ can be Si, Ge, Ti, Ir, Ru, Sn, Hf, Zr, or combinations of these, $M^{5+}$ can be V, Nb, Ta, or combinations of these, $0 \leq y \leq 1$, the mean ionic radius of the $M^{3+}$ cations and the mean ionic radius of the $M^{5+}$ cations are each about 0.4 to 1.00 Å when coordinated by six oxygen anions, and each of the mean ionic radii of the $M^{4+}$ cations and the $M^{5+}$ cations is no greater than about 0.53+(0.30×the mean ionic radius of the $M^{3+}$ cations).

By mean ionic radius is meant the average ionic radius of the cations of a specific type weighted by their atomic fraction. For example, the mean ionic radius of the $M^{3+}$ cations in the compound $KY_{0.75}La_{0.25}Zr_2Si_2P_6O_{25}$ is equal to $(0.75) \times (0.90$ Å$) + (0.25) \times (1.03$ Å$)$.

Some metals that are useful as the $M^{3+}$, $M^{4+}$, and $M^{5+}$ components in the compound formula are Y and Zr, to yield e.g. $AYZr_2Si_2P_6O_{25}$, Al and Ti, to yield e.g. $AAlTi_2Si_2P_6O_{25}$, In and Zr, to yield e.g. $AInZr_2Si_2P_6O_{25}$, Ga and Ti, to yield, e.g. $AGaTi_2Si_2P_6O_{25}$, Al and Nb to yield e.g. $AAl_2NbSi_2P_6O_{25}$, Ga and Ge to yield, e.g. $AGaGe_2Si_2P_6O_{25}$, Fe and Ti to yield, e.g. $AFeTi_2Si_2P_6O_{25}$, Cr and Ti to yield, e.g. $ACrTi_2Si_2P_6O_{25}$, Al and Si to yield, e.g. $AAlSi_2Si_2P_6O_{25}$, and Y and Ti to yield, e.g. $AYTi_2Si_2P_6O_{25}$. Especially suited are the above compounds of Y and Zr, and Al and Ti. An especially preferred compound is $KYZr_2Si_2P_6O_{25}$.

The combination of Al and Zr does not form $AAlZr_2Si_2P_6O_{25}$ and the combination of Ga and Zr does not form $AGaZr_2Si_2P_6O_{25}$ because they do not fulfill the requirement of ionic radius of the $M^{4+}$ metal being no greater than about 0.53+(0.30× the ionic radius of the $M^{3+}$metal). Also, the combination of La and Zr does not form $ALaZr_2Si_2P_6O_2$ because the ionic radius of La (1.03 Å) exceeds the 1.00 Å upper limit for the mean ionic radius of the $M^{3+}$ metals.

One method of making the compound of the present invention is by the powder method in which the appropriate raw materials in dry or powder form are combined to form a homogeneous mixture in amounts needed to give the correct stoichiometry in the desired product. In this method, a compound of K, Rb, or Cs and preferably of K is used to provide the alkali metal. For example, carbonates are especially suitable because they are inexpensive and the gas released by decomposition is not hazardous. Other compounds that provide some of the other components, such as for example, $KAlSi_2O_6$ or $KAlSiO_4$ for compositions that contain aluminum are also suitable. Other suitable compounds are the nitrates, sulfates, hydroxides, etc.

The $M^{3+}$, $M^{4+}$, and $M^{5+}$ metals are provided by species that yield their respective oxides upon firing. This also includes their free oxides. Examples of some suitable oxide-yielding species, although it is to be understood that the invention is not limited to these, are $ZrO_2$, $ZrSiO_4$ (zircon), $ZrP_2O_7$, $Zr_2P_2O_9$; $Y_2O_3$; oxides or hydroxides of gallium; aluminum oxide, hydroxide, or phosphate; clay or other aluminosilicate; titanium oxide; niobium oxide; iron oxide; chromium oxide; germanium oxide; indium oxide; etc.

The Si can be provided as crystalline or amorphous $SiO_2$, silicone resin or at least partially as silicates of the above metals.

The P can be provided as a phosphate compound e.g. $(NH_4)H_2PO_4$, $(NH_4)_2HPO_4$ or $(NH_4)_3PO_4.H_2O$ or partially as phosphates of the above metals.

The powders can be dry blended or milled using an appropriate milling fluid to provide intimate admixing of the oxides or oxide-yielding starting materials, and promoting their reaction to form the desired $A(M_{1+y}{}^{3+}M_{2-2y}{}^{4+}M_y{}^{5+})Si_2P_6O_{25}$ crystalline phase. Milling is done in a ball mill, attritor mill, or vibratory mill with an organic milling fluid if necessary, such as e.g. isopropyl alcohol. The milled powders are then dried to remove the milling fluid.

The homogeneous mixture is then shaped into a preform, such as for example into bars. The preform is then fired in air at a sufficient temperature and for a sufficient time to form the desired compound. Such firing conditions can be determined by those skilled in the art. In most cases, the firing temperature is between about 800° C. to 1300° C., although this can vary.

Preferably, the homogenous mixture is calcined in air at a sufficient temperature and for a sufficient time to remove the volatile constituents of the raw materials and to pre-react the oxides. Calcining conditions are typically at about 400° C. to 1000° C. although this can vary. The calcined powder is then re-pulverized such as by milling, and if milled, the milled material is dried prior to being shaped and fired. The material can be mixed with a binder prior to shaping.

One especially suitable method of making $KYZr_2Si_2P_6O_{25}$ by the above described dry powder method is to mix and mill together $K_2CO_3$, $ZrO_2$, $Y_2O_3$, $SiO_2$, and $NH_4H_2PO_4$ powders in isopropyl alcohol. The milled material is dried in air at about 40° C. to 90° C., calcined at about 400° C. to 1000° C., pressed into pills, and fired at about 800° C. to 1300° C.

Another method of making the compound is by what is called a sol gel technique. In this technique the raw materials are provided in solubilized form or as a colloidal suspension.

For example, the alkali metal is provided as water soluble salts such as carbonates, nitrates, sulfates, chlorides, bromides, iodides, hydroxides, acetates, formates, silicates and phosphates, the latter also supply some of the required Si and P.

The $M^{3+}$, $M^{4+}$, and $M^{5+}$ metals are provided as various water soluble salts, or alternately as very fine such as for example average particle diameter of less than about 10 micrometers, and preferably less than about 1 micrometer insoluble oxides of the respective metals. For example, zirconium can be provided as zirconium nitrate hydrate, zirconium sulfate, zirconium sulfate hydrate, zirconyl chloride hydrate, zirconium propoxide, etc. Yttrium can be provided as yttrium nitrate hydrate, yttrium sulfate, yttrium chloride, yttrium chloride hydrate, yttrium acetate, yttrium isopropoxide, etc. Titanium can be provided as the bromide, chloride, oxalate, etc. Aluminum can be provided as nitrate, sulfate, iodide, perchlorate, ethoxide, etc. Gallium can be provided as nitrate, sulfate, perchlorate, chloride, bromide, etc. Indium can be provided as indium nitrate, indium sulfate, indium chloride, indium bromide, etc. Iron can be provided as iron nitrate hydrate, iron bromide, iron chloride, iron citrate, iron acetate, iron fluoride, iron iodide, iron oxalate, iron sulfate, etc. Chromium can be provided as chromium acetate, chromium bromide, chromium chloride, chromium nitrate hydrate, chromium oxalate, chromium sulfate, etc.

The P can be provided in the same forms as described above for the dry method.

The Si can be provided as silicic acid or as colloidal silica.

The solutions or suspensions are dried about 40° C. to 90° C. to obtain a sol gel powder.

The dried powder is then calcined in air as described previously.

The calcined powder is then pulverized and fired as described previously to obtain the final product.

One especially suitable method of making $KYZr_2Si_2P_6O_{25}$ by the above described sol gel method is to prepare an aqueous solution of $KNO_3$ or $K_2CO_3$, $ZrO(NO_3)_2.nH_2O$, and/or $ZrOCl_2.nH_2O$, $Y(NO_3)_3.9H_2O$, $NH_4H_2PO_4$, and colloidal $SiO_2$, and adjusting the pH to about 9.0 by the addition of ammonium hydroxide solution. This combination is dried at about 40° C. to 90° C. and calcined at about 700° C. to 1000° C. The calcined material is then milled in isopropyl alcohol, dried, and pressed into pills which are then fired at about 1000° to 1250° C. for about 5 to 100 hours.

The compounds of the present invention are relatively stable in air and are suitable in applications in which there is high temperature cycling, requiring materials to be thermally stable and to have low thermal expansion.

To more fully illustrate the invention, the following non-limiting examples are presented. All parts, portions, and percentages are on a weight basis unless otherwise stated.

INVENTIVE EXAMPLES

Example 1

Aqueous solutions of $KNO_3$ and $Y(NO_3)_3.6H_2O$ were mixed together in a Teflon beaker, followed by the addition of $ZrO(NO_3)_2.6H_2O$ solution (Table 1). A mixture of colloidal silica and $NH_4H_2PO_4$ solution was slowly added to the nitrate solution with vigorous agitation, forming a white gelatinous precipitate. The pH was adjusted to 9.0 by the addition of ammonium hydroxide solution, and the temperature raised to about 80° C. for about 15 hours with constant agitation until the mixture had dried to a paste-like consistency. The gel was further dried at about 90° C. for about 15 hours, then broken up and placed in a zirconia crucible. The gel was heated at about 100° C./hr. to about 900° C., calcined for about 9 hours, and cooled to room temperature. The calcined material was ball milled in isopropyl alcohol for about 15 hours using zirconia media, dried, and re-pulverized to a powder.

The calcined powder was pressed into 0.5 cm×1.2 cm×7.5 cm bars at about 600 kg/cm$^2$, and the bars set on coarse alumina sand in alumina boxes. The bars were then fired at about 100° C./hr. in air and held at the temperatures and soak times indicated in Table 2. The fired ceramics were examined by powder x-ray diffractometry and observed to contain an hexagonal $KYZr_2Si_2P_6O_5$ compound for all firing temperatures from about 900° C. to 1200° C. With increasing temperature or soak time from about 900° C. to 1100° C., the amounts of residual $ZrP_2O_7+YPO_4$ decreased by reaction to form $KYZr_2Si_2P_6O_{25}$. However, at about 1200° C. the $KYZr_2Si_2P_6O_{25}$ compound began to decompose to $ZrP_2O_7+YPO_4+KZr_2P_3O_{12}$.

The powder XRD pattern for the sample fired at about 1100° C. for about 96 hours is shown in FIG. 1. Unit cell refinement of these data indicates that this compound has an hexagonal crystal structure with an "a" unit cell dimension equal to 8.602 Å and a "c" unit cell dimension of 17.614 Å.

Figure 2:
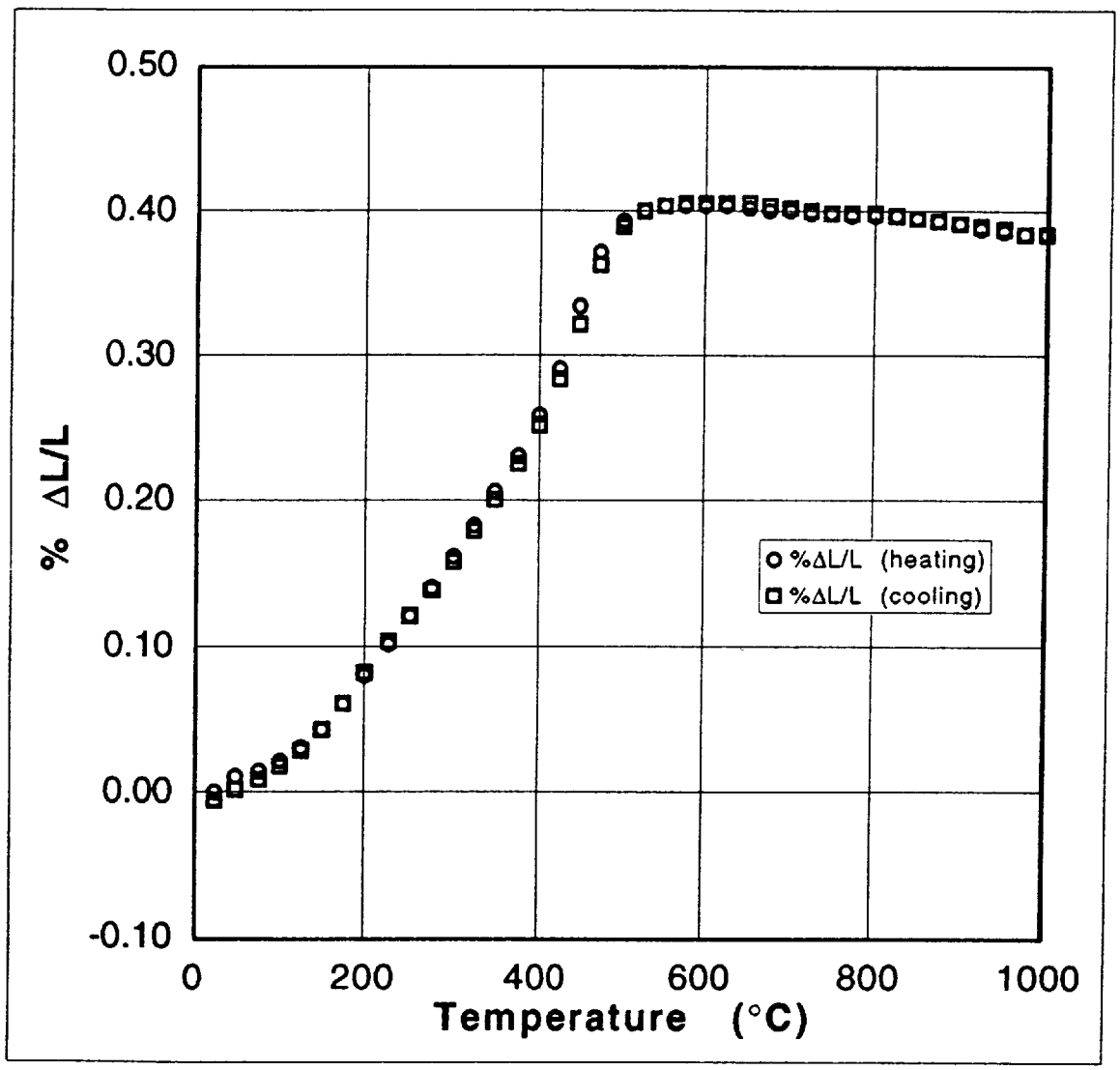
FIG. 2 is a plot showing the percent linear expansion of $KYZr_2Si_2P_6O_{25}$ sintered at 1100° C. for 96 hours.

The thermal expansion of the $KYZr_2Si_2P_6O_{25}$ bar fired at about 1100° C. for about 96 hours was measured by dilatometry from room temperature to about 1000° C. (FIG. 2). Although this material has a moderately high average coefficient of thermal expansion (CTE) from 25° to 500° C. of about $8.3\times10^{-6}$° $C^{-1}$, the coefficient of thermal expansion becomes very small and slightly negative above about 550° C., averaging about $-0.4\times10^{-6}$° $C^{-1}$ from about 550° C. to 1000° C. The mean CTE from 25° to 1000° C. is about $4.0\times10^{-6}$° $C^{-1}$.

Example 2

A mixture of $K_2CO_3$, $Y_2O_3$, $ZrO_2$, $SiO_2$, and $NH_4H_2PO_4$ (Table 1) was ball milled in isopropyl alcohol with cylindrical alumina milling media for about 15 hours. The slurry was dried at about 90° C. for about 15 hours and the dried cake re-pulverized to a powder using a mortar and pestle. A 3.5-cm diameter disc was pressed from the powder at a pressure of about 100 kg/cm$^2$, placed on coarse alumina sand in an alumina box, fired in air at the temperatures and soak times indicated in Table 2, and cooled to room temperature. Powder x-ray diffractometry (XRD) of the fired samples showed the presence of the $KYZr_2Si_2P_6O_{25}$ compound in the 1230° C. firing; however, this compound had completely dissociated to $ZrP_2O_7+YPO_4+KZr_2P_3O_{12}+$ cristobalite ($SiO_2$) at about 1300° and 1400° C.

Example 3

A sol-gel was prepared from solutions of $RbNO_3$, $Y(C_2H_3O_2)_3.4H_2O$, $ZrO(NO_3)_2.6H_2O$, $NH_4H_2PO_4$, and colloidal silica (Table 1) which were mixed in sequence, dried, calcined, and ball milled following the same procedure as in Example 1. A bar pressed from the calcined powder was fired at about 1100° C. for about 20 hours in air. Powder x-ray diffractometry demonstrated the formation of an hexagonal $RbYZr_2Si_2P_6O_{25}$ compound with approximate unit cell parameters of a=8.59 Å and c=17.86 Å. Minor amounts of $ZrP_2O_7$ and $YPO_4$ were also present.

Example 4

A sol-gel was prepared from solutions of $Cs_2CO_3$, $Y(NO_3)_3.6H_2O$, $ZrO(NO_3)_2.6H_2O$, $NH_4H_2PO_4$, and colloidal silica (Table 1) which were mixed in sequence, dried, calcined, and ball milled following the same procedure as Example 1. A bar pressed from the calcined powder was fired at about 1100° C. for about 96 hours in air. Powder x-ray diffractometry demonstrated the formation of an hexagonal $CsYZr_2Si_2P_6O_{25}$ compound with approximate unit cell dimensions of a=8.54 Å and c=18.16 Å. Minor amounts of $ZrP_2O_7$, $YPO_4$, and cristobalite were also present.

Example 5

A sol-gel was prepared from solutions of $K_2CO_3$, $In(NO_3)_3$, $ZrOCl_2.8H_2O$, $NH_4H_2PO_4$, and colloidal silica (Table 1) which were mixed in sequence, and dried following the same procedure as Example 1. The dried gel was then calcined at about 700° C. for about 24 hours, ball milled in isopropyl alcohol with cylindrical zirconia milling media for about 15 hours, dried in air, and re-pulverized. A bar pressed from the calcined powder was fired at about 1100° C. for about 10 hours in air. Powder x-ray diffractometry demonstrated the formation of an hexagonal $KInZr_2Si_2P_6O_{25}$ compound with approximate unit cell parameters of a=8.52 Å and c=17.46 Å. Minor amounts of $ZrP_2O_7$ and $KZr_2P_3O_{12}$ were also present.

Figure 3:
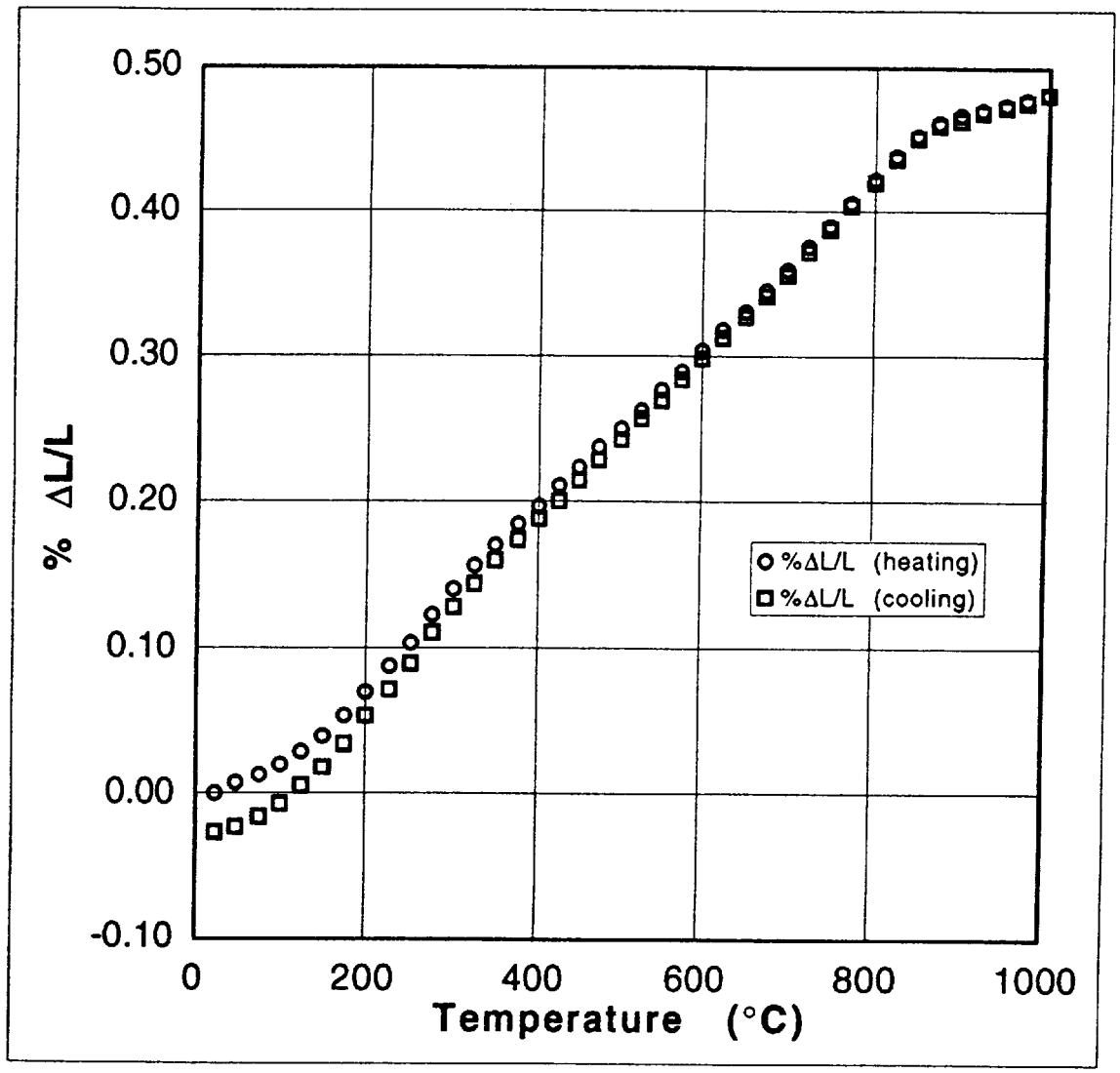
FIG. 3 is a plot showing the percent linear expansion of $KInZr_2Si_2P_6O_{25}$ sintered at 1100° C. for 10 hours.

The percent linear thermal expansion curve of the $KInZr_2Si_2P_6O_{25}$ ceramic fired at about 1100° C. is shown in FIG. 3. The mean coefficient of thermal expansion (CTE) from room temperature to about 1000° C. is about $4.9\times10^{-6}$° $C^{.1}$. Above about 800° C., the CTE reduces to about $3.0\times10^{-6}$° $C^{.1}$.

Example 6

Figure 4:
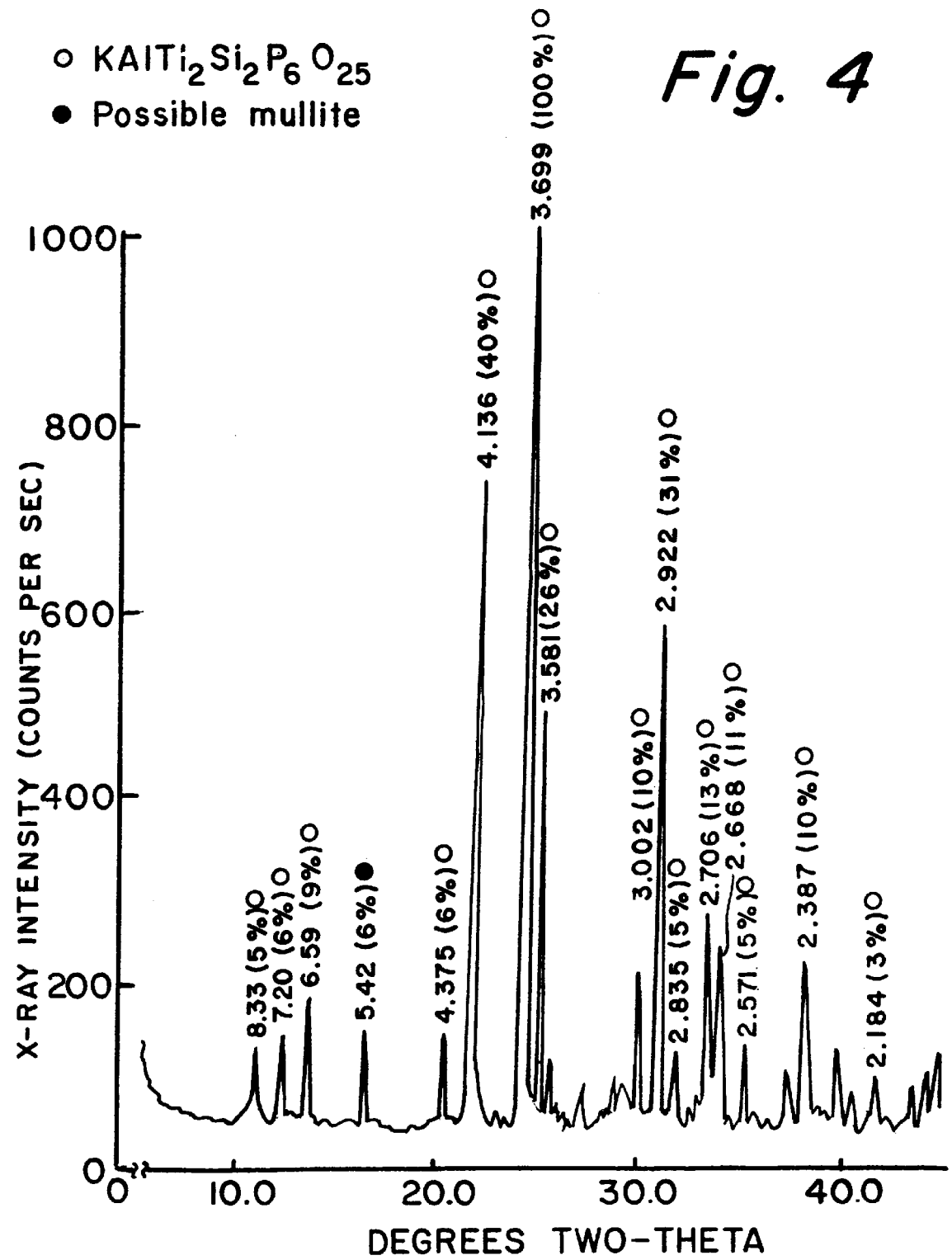
FIG. 4 is a powder x-ray diffraction pattern for $KAlTi_2Si_2P_6O_{25}$.

A sol-gel was prepared from solutions of $KNO_3$, $Al(NO_3)_3.9H_2O$, $NH_4H_2PO_4$, colloidal silica, and an aqueous suspension of $TiO_2$ powder (Table 1) which were mixed in sequence, dried, calcined, and ball milled following the same procedure as Example 1. Bars pressed from the calcined powder were fired at about 1000° C., 1100° C., and 1200° C., each for about 8 hours in air. Powder x-ray diffractometry demonstrated the formation of an hexagonal $KAlTi_2Si_2P_6O_{25}$ compound with approximate unit cell parameters of a=8.35 Å and c=16.68 Å. Minor amounts of an unidentified secondary phase, possibly mullite ($Al_6Si_2O_{13}$), were also present at all temperatures. The powder XRD pattern for the $KAlTi_2Si_2P_6O_{25}$ ceramic fired at about 1100° C. is shown in FIG. 4.

Example 7

A sol-gel was prepared from solutions of $RbNO_3$, $Al(NO_3)_3.9H_2O$, $NH_4H_2PO_4$, colloidal silica, and an aqueous suspension of $TiO_2$ powder (Table 1) which were mixed in sequence and dried following the same procedure as Example 1. The dried gel was calcined at about 1000° C. for about 8 hours, ball milled in alcohol, dried in air, and re-pulverized. Bars pressed from the calcined powder were fired at about 900° C., 1000° C., and 1100° C., each for about 10 hours in air. Powder x-ray diffractometry demonstrated the formation of an hexagonal $RbAlTi_2Si_2P_6O_{25}$ compound with approximate unit cell parameters of a=8.16 Å and c=17.04 Å. Minor amounts of an unidentified secondary phase, possibly mullite ($Al_6Si_2O_{13}$), were also present at all temperatures.

Example 8

A sol-gel was prepared from solutions of $Cs_2CO_3$, $Al(NO_3)_3.9H_2O$, $NH_4H_2PO_4$, colloidal silica, and an aqueous suspension of $TiO_2$ powder (Table 1) which were mixed in sequence, dried, calcined, and ball miller, following the same procedure as Example 7. Bars pressed from the calcined powder were fired at about 900° C., 1000° C., and 1100° C., each for about 10 hours in air. Powder x-ray diffractometry demonstrated the formation of an hexagonal $CsAlTi_2Si_2P_6O_{25}$ compound with approximate unit cell parameters of a=8.11 Å and c=17.10 Å. Minor amounts of an unidentified secondary phase, possibly mullite ($Al_6Si_2O_{13}$), were also present at all temperatures.

Example 9

A sol-gel was prepared from solutions of $K_2CO_3$, $NH_4H_2PO_4$, colloidal silica, and an aqueous suspension of $TiO_2$ and $Ga_2O_3$ powders (Table 1) which were mixed in sequence, dried, calcined, and ball milled following the same procedure as Example 7. Bars pressed from the calcined powder were fired at about 900° C., 1000° C., and 1100° C., each for about 10 hours in air. Powder x-ray diffractometry demonstrated the formation of an hexagonal $KGaTi_2Si_2P_6O_{25}$ compound for all firing temperatures. Least squares refinement of the XRD data yielded unit cell parameters of a=8.188 Å and c=17.032 Å. Minor amounts of $GaPO_4$ and $KTi_2P_3O_{12}$ were present at all temperatures.

Example 10

A sol-gel was prepared from solutions of $K_2CO_3$, $Al(NO_3)_3.9H_2O$, $NH_4H_2PO_4$, colloidal silica, and an aqueous suspension of $Nb_2O_5$ powder (Table 1) which were mixed in sequence, dried, calcined, and ball milled following the same procedure as Example 7. Bars pressed from the calcined powder were fired at about 900° C., 1000° C., and 1100° C., each for about 10 hours in air. Powder x-ray diffractometry demonstrated the formation of an hexagonal $KNbAl_2Si_2P_6O_{25}$ compound in the 900° C. and 1000° C. samples. Least squares refinement of the XRD data yielded unit cell parameters of a=8.160 Å and c=16.959 Å. Minor amounts of an unidentified phase, possibly mullite, were present in the 900° C. and 1000° C. samples. A rhombohedral phase believed to be $KAlNbP_3O_{12}$ was present in small quantities in the 1000° C. firing, while the 1100° C. firing yielded $KAlNbP_3O_{12}$, cristobalite, and an amorphous phase (possibly glass from partial melting). These experiments demonstrate that it is possible to partially or entirely replace the tetravalent $M^{4+}$ cations in the 6-fold coordination sites with a pentavalent plus a trivalent cation.

Example 11

A sol-gel was prepared from solutions of $K_2CO_3$, $Fe(NO_3)_3.9H_2O$, $NH_4H_2PO_4$, colloidal silica, and an aqueous suspension of $TiO_2$ powder (Table 1) which were mixed in sequence, dried, calcined, and ball milled following the same procedure as Example 5. Bars pressed from the calcined powder were fired at about 900° C., 1000° C., and 1100° C., each for about 10 hours in air. Powder x-ray diffractometry demonstrated the formation of an hexagonal $KFeTi_2Si_2P_6O_{25}$ compound for all firing temperatures. Least squares refinement of the XRD data yielded unit cell parameters of a=8.225 Å and c=17.030 Å. Minor amounts of anatase ($TiO_2$) and an unidentified phase were also present.

Example 12

A sol-gel was prepared from solutions of $K_2CO_3$, $Cr(NO_3)_3.9H_2O$, $NH_4H_2PO_4$, colloidal silica, and an aqueous suspension of $TiO_2$ powder (Table 1) which were mixed in sequence, dried, calcined, and ball milled following the same procedure as Example 5. Bars pressed from the calcined powder were fired at about 900° C., 1000° C., and 1100° C., each for about 10 hours in air. Powder x-ray diffractometry demonstrated the formation of an hexagonal $KCrTi_2Si_2P_6O_{25}$ compound for all firing temperatures, with approximate unit cell parameters of a=8.16 Å and c=17.08 Å. Minor amounts of titania (anatase and rutile structures) and an unidentified phase were also present.

Example 13

A sol-gel was prepared from solutions of $K_2CO_3$, $NH_4H_2PO_4$, colloidal silica, and an aqueous suspension of $GeO_2$ and $Ga_2O_3$ powders (Table 1) which were mixed in sequence, dried, calcined, and ball milled following the same procedure as Example 5. Bars pressed from the calcined powder were fired at about 900° C., and 1000° C. each for about 10 hours in air. Powder x-ray diffractometry demonstrated the formation of an hexagonal $KGaGe_2Si_2P_6O_{25}$ compound for both firing temperatures. Least squares refinement of the XRD data yielded unit cell parameters of a=8.017 Å and c=16.496 Å. Minor amounts of one or more unidentified phases were also present. The powder XRD pattern for the ceramic fired at about 1000° C. is depicted in FIG. 5.

Example 14

A sol-gel was prepared from solutions of $K_2CO_3$, $Al(NO_3)_3.9H_2O$, $NH_4H_2PO_4$, colloidal silica (Table 1) which were mixed in sequence and dried following the same procedure as in Example 1. The gel was then calcined at about 700° C. for about 5 hours, ball milled, dried, and pulverized. Bars pressed from the calcined powder were fired at about 800° C. (50 hours), 900° C. (10 hours), and 1000° C. (10 hours), in air. Powder x-ray diffractometry demonstrated the formation of an hexagonal $KAlSi_2Si_2P_6O_{25}$ compound in the 800° C. sample, with approximate unit cell parameters of a=7.94 Å and c=16.22 Å. Minor amounts of two unidentified phases were also present in the 800° C. sample. The sample fired at about 900° C. consisted mainly of $Si_3Si_2P_6O_{25}$, and $AlSi_2P_3O_{12}$ plus unidentified phases. The $Si_3Si_2P_6O_{25}$ compound has a crystal structure similar to $KAlSi_2Si_2P_6O_{25}$, but lacks potassium and exhibits unit cell parameters of a=7.875 Å and c=24.09 Å. The 1000° C. sample consisted of $Si_3Si_2P_6O_{25}$, $AlSi_2P_3O_{12}$, an unidentified phase, and glass resulting from partial melting. Thus, although it is possible to form the $KAlSi_2Si_2P_6O_{25}$ compound, the thermal stability of this material appears to be limited to temperatures not greater than 900° C.

Example 15

A sol-gel was prepared from solutions of $K_2CO_3$, $Y(NO_3)_3.6H_2O$, $NH_4H_2PO_4$, colloidal silica, and an aqueous suspension of $TiO_2$ powder (Table 1) which were mixed in sequence, dried, calcined, and ball milled following the same procedure as Example 5. Bars pressed from the calcined powder were fired at about 800° C. (50 hours), 900° C., (10 hours), 1000° C. (10 hours), and 1100° C. (10 hours) in air. Powder x-ray diffractometry indicated the apparent formation of an hexagonal $KYTi_2Si_2P_6O_{25}$ compound in the 800° C. and 900° C. samples, with approximate unit cell parameters of a=8.33 Å and c=18.00 Å. The $KYTi_2Si_2P_6O_{25}$ phase was accompanied by anatase ($TiO_2$), a rhombohedral phase with approximate unit cell parameters of a=8.4 Å and c=22.9 Å, and at least one other unidentified phase. $KYTi_2Si_2P_6O_{25}$ was absent from the 1000° C. and 1100° C. samples. Thus, the $KYTi_2Si_2P_6O_{25}$ compound appears to have a very limited thermal stability.

COMPARATIVE EXAMPLES

Example 16

To determine whether sodium could be substituted into the alkali ("A") site of an $AAlTi_2Si_2P_6O_{25}$ type compound, a sol-gel was prepared by mixing in sequence, solutions of $Na_2CO_3$, $Al(NO_3)_3 \cdot 9H_2O$, $NH_4H_2PO_4$, colloidal silica, and an aqueous suspension of $TiO_2$ (Table 3). The resulting sol-gel was dried, calcined, ball milled, and pressed into bars. The bars were fired at 1000° C. (8 hours), 1100° C. (8 hours) and 1200° C. (8 hours). X-ray diffractometry showed no $NaAlTi_2Si_2P_6O_{25}$ in any of the samples. The 1000° C. sample consisted of $TiP_2O_7$+cristobalite+an amorphous phase, while the 1100° C. and 1200° C. samples also contained $NaTi_2P_3O_{12}$. Thus, the sodium ion is apparently too small to exist within the $AAlTi_2Si_2P_6O_{25}$ structure.

Examples 17 and 18

Because the ionic radius of the divalent barium cation is similar to the radius of the monovalent potassium cation ($Ba^{2+}$=1.61 Å, $K^+$=1.64 Å), an attempt was made to replace potassium with barium in the $AAlTi_2Si_2P_6O_{25}$ crystal structure. In one case (Example 17), charge balance was maintained by replacing the potassium atoms with one-half as many barium atoms in an effort to produce a compound with the formula $Ba_{0.5}AlTi_2Si_2P_6O_{25}$. In another case, (Example 18), the potassium atoms were replaced with an equal number of barium atoms and charge balance was maintained by also replacing one-half of the tetravalent titanium cations with trivalent aluminum cations in an effort to produce a compound with the formula $BaAl_2TiSi_2P_6O_{25}$. A sol-gel of the $Ba_{0.5}AlTi_2Si_2P_6O_{25}$ composition was prepared by sequentially mixing solutions of $Ba(NO_3)_2$, $Al(NO_3)_3 \cdot 9H_2O$, $NH_4H_2PO_4$, colloidal silica, and an aqueous suspension of $TiO_2$ (Table 3). A sol-gel of the $BaAl_2TiSi_2P_6O_{25}$ composition was prepared by sequentially mixing solutions of $Ba(C_2H_3O_2)_2$, $Al(NO_3)_3 \cdot 9H_2O$, $NH_4H_2PO_4$, colloidal silica, and an aqueous suspension of $TiO_2$ (Table 3). The gels were dried, calcined, ball milled, and pressed into bars. The samples of the $Ba_{0.5}AlTi_2Si_2P_6O_{25}$ composition were fired at about 1000° C., 1100° C., and 1200° C. (8 hours each) while the bars of $BaAl_2TiSi_2P_6O_{25}$ composition were fired at about 900° C., 1000° C., and 1100° C. (10 hours each).

X-ray diffractometry showed that the composition of Example 17 did not form the $Ba_{0.5}AlTi_2Si_2P_6O_{25}$ compound at any temperature, instead forming $TiP_2O_7$+$BaTiP_2O_8$+cristobalite.

X-ray diffractometry showed that the composition of Example 18 did not form the $BaAl_2TiSi_2P_6O_{25}$ compound at any temperature, instead forming $TiP_2O_7$+cristobalite+an amorphous phase+$BaTiP_2O_8$ and, at about 1000° C., a $BaTi_4P_6O_{24}$ type phase.

From these examples, it is concluded that the divalent alkaline earth (Group IIA) cations (Mg, Ca, Sr, Ba, Ra) cannot be substituted in the "A" site of the $AAlTi_2Si_2P_6O_{25}$ compounds.

Example 19

In an attempt to form the compound $KLaZr_2Si_2P_6O_{25}$, a sol-gel was formed by sequentially mixing solutions of $K_2CO_3$, $La(NO_3)_3 \cdot 6H_2O$, $ZrOCl_2 \cdot 8H_2O$, $NH_4H_2PO_4$, and colloidal silica (Table 3). The sol-gel was dried, calcined, ball milled, and pressed into bars. Bars were fired at about 900° C., 1000° C., and 1100° C. for about 10 hours each. XRD showed that no $KLaZr_2Si_2P_6O_{25}$ compound was formed at any temperature; instead, the samples consisted of a mixture of $ZrP_2O_7$+$KZr_2P_3O_{12}$+$LaPO_4$+cristobalite. These experiments demonstrate that the lanthanum cation is apparently too large (ionic radius=1.03 Å) to fully occupy the $M^{3+}$ sites in the inventive silicophosphate crystal structure. However, it is possible that small amounts of lanthanum may substitute for yttrium in the $KYZr_2Si_2P_6O_{25}$ compound.

Example 20

In an attempt to form the compound $KGaZr_2Si_2P_6O_{25}$, a sol-gel was formed by sequentially mixing solutions of $K_2CO_3$, $ZrOCl_2 \cdot 8H_2O$, $NH_4H_2PO_4$, colloidal silica, and an aqueous suspension of $Ga_2O_3$ (Table 3). The sol-gel was dried, calcined, ball milled, and pressed into bars. Bars were fired at about 900° C., 1000° C., and 1100° C. each for about 10 hours. XRD showed that no $KGaZr_2Si_2P_6O_{25}$ compound was formed at any temperature; instead, the samples consisted of a mixture of $ZrP_2O_7$+$KZr_2P_3O_{12}$+$KGaP_2O_7$+cristobalite. Thus, although Examples 9 and 13 demonstrate that gallium can exist in the inventive silicophosphate crystal structure, and Examples 1 through 5 show that zirconium can be in the inventive crystal structure, the present example demonstrates that gallium and zirconium, in combination, do not form a $KGaZr_2Si_2P_6O_{25}$ compound. This is because the $Ga^{3+}$ cation is too small (0.62 Å) relative to the size of the $Zr^{4+}$ cation (0.72 Å) as shown in FIG. 6, so that the requirement that the mean ionic radius of the $M^{4+}$ cations must not be greater than 0.53+(0.30×the mean ionic radius of the $M^{3+}$ cations) is not satisfied by this pair of cations.

Example 21

To further demonstrate that the mean ionic radius of the six-fold coordinated $M^{4+}$ cations must not be greater than 0.53+(0.30×the mean ionic radius of the $M^{3+}$ cations), a sol-gel having a bulk composition equal to $KAlZr_2Si_2P_6O_{25}$ was prepared by mixing powders of $K_2CO_3$, $Al_2O_3$, $ZrO_2$, $NH_4H_2PO_4$, and $SiO_2$ in isopropyl alcohol, drying the mixture, and pressing the powder mixture into discs (Table 3). The discs were fired at about 1000° C. for about 10 hours and 1100° C. for about 72 hours. The only phases present in the fired samples were $ZrP_2O_7$, $ZrP_2P_3O_{12}$, and cristobalite. Thus, although Examples 1 through 5 and Examples 6, 7, 8, 10, and 14 show that compounds with the inventive crystal structure can be formed which contain either aluminum or zirconium, these two metals cannot be combined to produce a $KAlZr_2Si_2P_6O_{25}$ compound because the ionic radius of $Zr^{4+}$ (0.72 Å) is too large relative to that of $Al^{3+}$ (0.535 Å), that is, the ionic radius of the $M^{4+}$ cation is greater than 0.53+(0.30×the ionic radius of $M^{3+}$) as depicted in FIG. 6.

TABLE 1
Compositions of Inventive Examples

| Weight Percent | $KYZr_2Si_2P_6O_{25}$ 1 | $KYZr_2Si_2P_6O_{25}$ 2 | $RbYZr_2Si_2P_6O_{25}$ 3 | $CsYZr_2Si_2P_6O_{25}$ 4 | $KInZr_2Si_2P_6O_{25}$ 5 | $KAlT_{12}Si_2P_6O_{25}$ 6 | $RbAlT_{12}Si_2P_6O_{25}$ 7 |
|---|---|---|---|---|---|---|---|
| $K_2CO_3$ (aqueous)(9.27 wt % K) | 0 | 0 | 0 | 0 | 0 | 0 | 0 |
| $KNO_3$ (aqueous)(3.55 wt % K) | 12.08 | 0 | 0 | 0 | 5.71 | 16.73 | 0 |
| $RbNO_3$ (aqueous)(7.45 wt % Rb) | 0 | 0 | 12.55 | 0 | 0 | 0 | 0 |
| $RbNO_3$ (aqueous)(12.00 wt % Rb) | 0 | 0 | 0 | 0 | 0 | 0 | 12.97 |
| $Cs_2CO_3$ (aqueous)(15.00 wt % Cs) | 0 | 0 | 0 | 7.64 | 0 | 0 | 0 |
| $Cs_2CO_3$ (aqueous)(20.05 wt % Cs) | 0 | 0 | 0 | 0 | 0 | 0 | 0 |
| $ZrOCl_2\cdot 8H_2O$ (aqueous)(9.76 wt % Zr) | 0 | 0 | 0 | 0 | 0 | 0 | 0 |
| $ZrO(NO_3)_2\cdot 6H_2O$ (aqueous)(6.83 wt % Zr) | 29.28 | 0 | 29.22 | 30.76 | 25.31 | 0 | 0 |
| $Al(NO_3)_3\cdot 9H_2O$ (aqueous)(1.96 wt % Al) | 0 | 0 | 0 | 0 | 0 | 0 | 0 |
| $Al(NO_3)_3\cdot 9H_2O$ (aqueous)(4.00 wt % Al) | 0 | 0 | 0 | 0 | 0 | 20.89 | 12.28 |
| $Y(NO_3)_3\cdot 6H_2O$ (aqueous)(6.52 wt % Y) | 14.94 | 0 | 0 | 15.70 | 0 | 0 | 0 |
| $Y(NO_3)_3\cdot 6H_2O$ (aqueous)(10.26 wt % Y) | 0 | 0 | 0 | 0 | 0 | 0 | 0 |
| $Y(C_2H_3O_2)_3\cdot 4H_2O$ (aqueous)(6.66 wt % Y) | 0 | 0 | 14.61 | 0 | 0 | 0 | 0 |
| $In(NO_3)_3$ (aqueous)(15.00 wt % In) | 0 | 0 | 0 | 0 | 15.55 | 0 | 0 |
| $Fe(NO_3)_3\cdot 9H_2O$ (aqueous)(5.00 wt % Fe) | 0 | 0 | 0 | 0 | 0 | 0 | 0 |
| $Cr(NO_3)_3\cdot 9H_2O$ (aqueous)(5.00 wt % Cr) | 0 | 0 | 0 | 0 | 0 | 0 | 0 |
| $NH_4H_2PO_4$ (aqueous) (5.09 wt % P) | 40.47 | 0 | 40.39 | 42.51 | 49.44 | 55.47 | 66.47 |
| $SiO_2$ (colloid) (40.72 wt % $SiO_2$) | 3.24 | 0 | 3.23 | 3.40 | 4.00 | 4.48 | 5.37 |
| $TiO_2$ (powder) | 0 | 0 | 0 | 0 | 0 | 2.43 | 2.91 |
| $GeO_2$ (powder) | 0 | 0 | 0 | 0 | 0 | 0 | 0 |
| $Ga_2O_3$ (powder) | 0 | 5.58 | 0 | 0 | 0 | 0 | 0 |
| $Nb_2O_5$ (powder) | 0 | 9.11 | 0 | 0 | 0 | 0 | 0 |
| $K_2CO_3$ (powder) | 0 | 19.89 | 0 | 0 | 0 | 0 | 0 |
| $Y_2O_3$ (powder) | 0 | 9.70 | 0 | 0 | 0 | 0 | 0 |
| $ZrO_2$ (powder) | 0 | 55.71 | 0 | 0 | 0 | 0 | 0 |
| $SiO_2$ (powder) | 0 | 0 | 0 | 0 | 0 | 0 | 0 |
| $NH_4H_2PO_4$ (crystals) | 0 | 0 | 0 | 0 | 0 | 0 | 0 |
| Powder XRD Peak Positions of Fired Compounds | | | | | | | |
| d(002), Å | 8.81 | 8.86 | 8.93 | 9.08 | 8.73 | 8.34 | 8.52 |
| d(100), Å | 7.45 | 7.44 | 7.44 | 7.40 | 7.38 | 7.23 | 7.07 |
| d(101), Å | 6.85 | 6.86 | 6.87 | 6.42 | 6.79 | 6.60 | 6.53 |
| Approximate Unit Cell Dimensions | | | | | | | |
| a, Å | 8.60 | 8.59 | 8.59 | 8.54 | 8.52 | 8.35 | 8.16 |
| c, Å | 17.61 | 17.72 | 17.86 | 18.16 | 17.46 | 16.68 | 17.04 |

| Weight Percent | $CsAlT_{12}Si_2P_6O_{25}$ 8 | $KGaT_{12}Si_2P_6O_{25}$ 9 | $KAl_2NbSi_2P_6O_{25}$ 10 | $KFeT_{12}Si_2P_6O_{25}$ 11 | $KCrT_{12}Si_2P_6O_{25}$ 12 | $KGaGe_2Si_2P_6O_{25}$ 13 | $KAlSi_5P_6O_{25}$ 14 | $KYT_{12}Si_2P_6O_{25}$ 15 |
|---|---|---|---|---|---|---|---|---|
| $K_2CO_3$ (aqueous)(9.27 wt % K) | 0 | 9.13 | 7.21 | 7.47 | 7.58 | 9.03 | 7.90 | 7.82 |
| $KNO_3$ (aqueous)(3.55 wt % K) | 0 | 0 | 0 | 0 | 0 | 0 | 0 | 0 |
| $RbNO_3$ (aqueous)(7.45 wt % Rb) | 0 | 0 | 0 | 0 | 0 | 0 | 0 | 0 |
| $RbNO_3$ (aqueous)(12.00 wt % Rb) | 0 | 0 | 0 | 0 | 0 | 0 | 0 | 0 |
| $Cs_2CO_3$ (aqueous)(15.00 wt % Cs) | 15.64 | 0 | 0 | 0 | 0 | 0 | 0 | 0 |
| $Cs_2CO_3$ (aqueous)(20.05 wt % Cs) | 0 | 0 | 0 | 0 | 0 | 0 | 0 | 0 |

TABLE 1-continued

Compositions of Inventive Examples

| | 1 | 2 | 3 | 4 | 5 | 6 | 7 |
|---|---|---|---|---|---|---|---|
| $ZrOCl_2$-$8H_2O$ (aqueous)(9.76 wt % Zr) | 11.90 | 0 | 0 | 0 | 0 | 0 | 0 |
| $ZrO(NO_3)_2$-$6H_2O$ (aqueous)(6.83 wt % Zr) | 0 | 0 | 0 | 0 | 0 | 0 | 0 |
| $Al(NO_3)_3$-$9H_2O$ (aqueous)(1.96 wt % Al) | 0 | 0 | 0 | 0 | 0 | 0 | 0 |
| $Al(NO_3)_3$-$9H_2O$ (aqueous)(4.00 wt % Al) | 0 | 0 | 0 | 0 | 23.06 | 12.64 | 0 |
| $Y(NO_3)_3$-$6H_2O$ (aqueous)(6.52 wt % Y) | 0 | 0 | 0 | 0 | 0 | 0 | 0 |
| $Y(NO_3)_3$-$6H_2O$ (aqueous)(10.26 wt % Y) | 0 | 0 | 0 | 0 | 0 | 0 | 16.06 |
| $Y(C_2H_3O_2)_3$-$4H_2O$ (aqueous)(6.66 wt % Y) | 0 | 0 | 0 | 0 | 0 | 0 | 0 |
| $In(NO_3)_3$ (aqueous)(15.00 wt % In) | 0 | 0 | 0 | 0 | 0 | 0 | 0 |
| $Fe(NO_3)_3$-$9H_2O$ (aqueous)(5.00 wt % Fe) | 0 | 0 | 19.79 | 0 | 0 | 0 | 0 |
| $Cr(NO_3)_3$-$9H_2O$ (aqueous)(5.00 wt % Cr) | 0 | 0 | 0 | 18.68 | 0 | 0 | 0 |
| $NH_4H_2PO_4$ (aqueous) (5.09 wt % P) | 64.43 | 79.00 | 62.41 | 65.58 | 78.17 | 68.40 | 67.68 |
| $SiO_2$ (colloid) (40.72 wt % $SiO_2$) | 5.21 | 6.39 | 5.04 | 5.30 | 6.32 | 11.06 | 5.47 |
| $TiO_2$ (powder) | 1.82 | 3.46 | 2.83 | 2.87 | 0 | 0 | 2.96 |
| $GeO_2$ (powder) | 0 | 0 | 0 | 0 | 4.48 | 0 | 0 |
| $Ga_2O_3$ (powder) | 0 | 0 | 0 | 0 | 2.01 | 0 | 0 |
| $Nb_2O_5$ (powder) | 0 | 2.03 | 2.27 | 0 | 0 | 0 | 0 |
| $K_2CO_3$ (powder) | 0 | 0 | 0 | 0 | 0 | 0 | 0 |
| $Y_2O_3$ (powder) | 0 | 0 | 0 | 0 | 0 | 0 | 0 |
| $ZrO_2$ (powder) | 0 | 0 | 0 | 0 | 0 | 0 | 0 |
| $SiO_2$ (powder) | 0 | 0 | 0 | 0 | 0 | 0 | 0 |
| $NH_4H_2PO_4$ (crystals) | 0 | 0 | 0 | 0 | 0 | 0 | 0 |
| Powder XRD Peak Positions of Fired Compounds | | | | | | | |
| d(002), Å | 8.55 | 8.51 | 8.50 | 8.54 | 8.25 | 8.11 | 9.00 |
| d(100), Å | 7.02 | 7.08 | 7.10 | 7.07 | 6.95 | 6.88 | 7.21 |
| d(101), Å | 6.50 | 6.54 | 6.56 | 6.53 | 6.40 | 6.32 | 6.67 |
| Approximate Unit Cell Dimensions | | | | | | | |
| a, Å | 8.11 | 8.19 | 8.22 | 8.16 | 8.02 | 7.94 | 8.33 |
| c, Å | 17.10 | 17.03 | 17.03 | 17.08 | 16.50 | 16.22 | 18.00 |

TABLE 2

Phases present in ceramics of $KYZr_2Si_2P_6O_{25}$ bulk composition prepared according to
Examples 1 and 2 and fired at various temperatures and times. The ratio of the 4.28Å
peak height of $KYZr_2Si_2P_6O_{25}$ to the sum of that peak height plus the 4.12Å peak
height of $ZrP_2O_7$ provides a qualitative indication of the extent to which
$KYZr_2Si_2P_6O_{25}$ has formed or dissociated.

| Example Number | Temperature (°C.) | Time (hours) | Phases Present | Peak Height Ratio 4.28Å/(4.28Å + 4.12Å) |
|---|---|---|---|---|
| 1a | 900 | 9 | $ZrP_2O_7$, $YPO_4$, $KYZr_2Si_2P_6O_{25}$ | 0.15 |
| 1b | 1100 | 8 | $KYZr_2Si_2P_6O_{25}$, $ZrP_2O_7$, $YPO_4$ | 0.67 |
| 1c | 1100 | 96 | $KYZr_2Si_2P_6O_{25}$, $ZrP_2O_7$, $YPO_4$, $KZr_2P_3O_{12}$ | 0.79 |
| 1d | 1200 | 9 | $KYZr_2Si_2P_6O_{25}$, $ZrP_2O_7$, $YPO_4$, $KZr_2P_3O_{12}$ | 0.61 |
| 1e | 1200 | 48 | $ZrP_2O_7$, $YPO_4$, $KYZr_2Si_2P_6O_{25}$, $KZr_2P_3O_{12}$ | 0.34 |
| 2a | 1230 | 15 | $KYZr_2Si_2P_6O_{25}$, $ZrP_2O_7$, $YPO_4$, $KZr_2P_3O_{12}$ | 0.56 |
| 2b | 1300 | 8 | $ZrP_2O_7$, $YPO_4$, $KZr_2P_3O_{12}$, $SiO_2$ | 0.00 |
| 2c | 1400 | 8 | $ZrP_2O_7$, $YPO_4$, $KZr_2P_3O_{12}$, $SiO_2$ | 0.00 |

TABLE 3

Compositions of Comparative Examples

| Weight Percent | $NaAlT_{12}Si_2P_6O_{25}$ 16 | $Ba_{0.5}AlT_{12}Si_2P_6O_{25}$ 17 | $BaAl_2TiSi_2P_6O_{25}$ 18 | $KLaZr_2Si_2P_6O_{25}$ 19 | $KGaZr_2Si_2P_6O_{25}$ 20 | $KalZr_2Si_2P_6O_{25}$ 21 |
|---|---|---|---|---|---|---|
| $Na_2CO_3$ (aqueous) (4.16 wt % Na) | 9.15 | 0 | 0 | 0 | 0 | 0 |
| $K_{2 CO3}$ (aqueous) (9.27 wt % K) | 0 | 0 | 0 | 5.89 | 6.66 | 0 |
| $Ba(NO_3)_2$ (aqueous) (15.00 wt % Ba) | 0 | 16.07 | 0 | 0 | 0 | 0 |
| $Ba(C_2H_3O_2)_2$ (aqueous) (10.94 wt % Ba) | 0 | 0 | 15.63 | 0 | 0 | 0 |
| $ZrOCl_2\cdot 8H_2O$ (aqueous) (9.76 wt % Zr) | 0 | 0 | 0 | 26.09 | 29.52 | 0 |
| $ZrO(NO_3)_2\cdot 6H_2O$ (aqueous) (6.83 wt % Zr) | 0 | 0 | 0 | 0 | 0 | 0 |
| $Al(NO_3)_3\cdot 9H_2O$ (aqueous) (1.96 wt % Al) | 22.79 | 0 | 34.24 | 0 | 0 | 0 |
| $Al(NO_3)_3\cdot 9H_2O$ (aqueous) (4.00 wt % Al) | 0 | 11.84 | 0 | 0 | 0 | 0 |
| $Y(C_2H_3O_2)_3\cdot 4H_2O$ (aqueous) (6.66 wt % Y) | 0 | 0 | 0 | 0 | 0 | 0 |
| $La(NO_3)_3\cdot 4H_2O$ (aqueous) (15.00 wt % La) | 0 | 0 | 0 | 12.93 | 0 | 0 |
| $NH_4H_2PO_4$ (aqueous) (5.09 wt % P) | 60.51 | 64.10 | 45.46 | 50.97 | 57.67 | 0 |
| $SiO_2$ (colloid) (40.72 wt % $SiO_2$) | 4.89 | 5.18 | 3.68 | 4.12 | 4.66 | 0 |
| $TiO_2$ (powder) | 2.65 | 2.81 | 0.99 | 0 | 0 | 0 |
| $Ga_2O_3$ (powder) | 0 | 0 | 0 | 0 | 1.48 | 0 |
| $K_2CO_3$ (powder) | 0 | 0 | 0 | 0 | 0 | 5.87 |
| $Al_2O_3$ (powder) | 0 | 0 | 0 | 0 | 0 | 4.33 |
| $ZrO_2$ (powder) | 0 | 0 | 0 | 0 | 0 | 20.94 |
| $SiO_2$ (powder) | 0 | 0 | 0 | 0 | 0 | 10.21 |
| $NH_4H_2PO_4$ (crystals) | 0 | 0 | 0 | 0 | 0 | 58.64 |

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A compound having the general formula $AM_{1+y}^{3+}M_{2-2y}^{4+}M_y^{5+}Si_2P_6O_{25}$, wherein A is selected from the group consisting of K, Rb, and Cs, $M^{3+}$ is selected from the group consisting of Al, Ga, Cr, Fe, Sc, In, Y, lanthanide series elements, and combinations thereof, $M^{4+}$ is selected from the group consisting of Si, Ge, Ti, Ir, Ru, Sn, Hf, Zr, and combinations thereof, $M^{5+}$ is selected from the group consisting of V, Nb, Ta, and combinations thereof, $0 \leq y \leq 1$, the mean ionic radius of the $M^{3+}$ cations and the mean ionic radius of the $M^{5+}$ cations are each about 0.4 to 1.00 Å when coordinated by six oxygen anions, and the mean ionic radii of the $M^{4+}$ cations and the $M^{5+}$ cations are each no greater than about $0.53+(0.30\times$the mean ionic radius of the $M^{3+}$ cations).

2. A compound of claim 1 wherein A is K.

3. A compound of claim 1 wherein $M^{3+}$ and $M^{4+}$ respectively are selected from the group consisting of Y and Zr, Al and Ti, In and Zr, Ga and Ti, Ga and Ge, Fe and Ti, Cr and Ti, and Al and Si, and wherein $M^{3+}$ and $M^{5+}$ respectively are Al and Nb.

4. A compound of claim 3 wherein $M^{3+}$ and $M^{4+}$ respectively are selected from the group consisting of Y and Zr, In and Zr, and Al and Ti.

5. A compound of claim 4 wherein the general formula is $AYZr_2Si_2P_6O_{25}$.

6. A compound of claim 5 wherein A is K.

7. A compound of claim 4 wherein the general formula is $AInZr_2Si_2P_6O_{25}$.

8. A compound of claim 7 wherein A is K.

9. A method of making a compound, said method comprising:
   a) providing a homogeneous raw material powder mixture to form a compound having the general formula $A(M^{3+}_{1+y}M^{4+}_{2-2y}M^{5+}_{y})Si_2P_6O_{25}$, wherein as raw materials, A is provided as alkali metal selected from the group consisting of K, Rb, and Cs, $M^{3+}$, $M^{4+}$, and $M^{5+}$ are provided as their oxide yielding species, wherein $M^{3+}$ is selected from the group consisting of Al, Ga, Cr, Fe, Sc, In, Y, lanthanide series elements, and combinations thereof, $M^{4+}$ is selected from the group consisting of Si, Ge, Ti, Ir, Ru, Sn, Hf, Zr, and combinations thereof, $M^{5+}$ is selected from the group consisting of V, Nb, Ta, and combinations thereof, $0 \leq y \leq 1$, the mean ionic radius of the $M^{3+}$ cations and the mean ionic radius of the $M^{5+}$ cations are each about 0.4 to 1.00 Å when coordinated by six oxygen anions, and the mean ionic radii of the $M^{4+}$ cations and the $M^{5+}$ cations are each no greater than about $0.53+(0.30\times$the mean ionic radius of the $M^{3+}$ cations), and wherein a source of silica and a source of phosphate are provided;
   b) shaping the mixture into a preform; and
   c) firing the preform at a sufficient temperature and for a sufficient time to form said compound having the general formula $AM^{3+}_{1+y}M^{4+}_{2-2y}M^{5+}_{y}Si_2P_6O_{25}$, wherein A is selected from the group consisting of K, Rb, and Cs, $M^{3+}$ is selected from the group consisting of Al, Ga, Cr, Fe, Sc, In, Y, lanthanide series elements, and combinations thereof, $M^{4+}$ is selected from the group consisting of Si, Ge, Ti, Ir, Ru, Sn, Hf, Zr, and combinations thereof, $M^{5+}$ is selected from the group consisting of V, Nb, Ta, and combinations thereof, $0 \leq y \leq 1$, the mean ionic radius of the $M^{3+}$ cations and the mean ionic radius of the $M^{5+}$ cations are each about 0.4 to 1.00 Å when coordinated by six oxygen anions, and the mean ionic radii of the $M^{4+}$ cations and the $M^{5+}$ cations are each no greater than about $0.53+(0.30\times$the mean ionic radius of the $M^{3+}$ cations).

10. A method of claim 9 comprising the additional steps after step a of calcining the powder, followed by pulverizing the calcined powder.

11. A method of claim 9 wherein the alkali metal is provided as K.

12. A method of claim 9 wherein $M^{3+}$ and $M^{4+}$ respectively are provided as oxide yielding species of metals selected from the group consisting of Y and Zr, Al and Ti, In and Zr, Ga and Ti, Ga and Ge, Fe and Ti, Cr and Ti, and Al and Si.

13. A method of claim 12 wherein $M^{3+}$ and $M^{4+}$ respectively are provided as oxide yielding species of metals selected from the group consisting of Y and Zr, In and Zr, and Al and Ti.

14. A method of claim 13 wherein raw materials are provided to yield a compound having the general formula $AYZr_2Si_2P_6O_{25}$.

15. A method of claim 14 wherein the alkali metal is provided as K.

16. A method of claim 15 wherein the alkali metal is provided as $K_2CO_3$, the oxide-yielding species are provided as $ZrO_2$ and $Y_2O_3$, and the phosphate-yielding species is provided as a phosphate compound selected from the group consisting of $NH_4H_2PO_4$, $(NH_4)HPO_4$, $(NH_4)_3PO_4 \cdot H_2O$, and combinations thereof.

17. A method of making a compound, the method comprising;
   a) providing an aqueous solution comprising raw materials to form a compound having the general formula $A(M^{3+}_{1+y}M^{4+}_{2-2y}M^{5+}_{y})Si_2P_6O_{25}$, wherein as raw materials, A is provided as one or more salts of alkali metal selected from the group consisting of K, Rb, and Cs, $M^{3+}$, $M^{4+}$, and $M^{5+}$ are provided as their compounds, wherein $M^{3+}$ is selected from the group consisting of Al, Ga, Cr, Fe, Sc, In, Y, lanthanide series elements, and combinations thereof, $M^{4+}$ is selected from the group consisting of Si, Ge, Ti, Ir, Ru, Sn, Hf, Zr, and combinations thereof, $M^{5+}$ is selected from the group consisting of V, Nb, Ta, and combinations thereof, $0 \leq y \leq 1$, the mean ionic radius of the $M^{3+}$ cations and the mean ionic radius of the $M^{5+}$ cations are each about 0.4 to 1.00 Å when coordinated by six oxygen anions, and the mean ionic radii of the $M^{4+}$ cations and the $M^{5+}$ cations are each no greater than about $0.53+(0.30\times$the mean ionic radius of the $M^{3+}$ cations), P is provided as phosphate compounds, and Si is provided by a source of silica;
   b) drying the solution to obtain a sol gel powder;
   c) calcining the sol gel powder;
   d) pulverizing the calcined sol gel powder;
   e) shaping the pulverized sol gel powder; and
   f) firing the resulting shaped powder at a sufficient temperature and for a sufficient time to form said compound having the general formula $AM^{3+}_{1+y}M^{4+}_{2-2y}{}^{5+}_{y}Si_2P_6O_{25}$, wherein A is selected from the group consisting of K, Rb, and Cs, $M^{3+}$ is selected from the group consisting of Al, Ga, Cr, Fe, Sc, In, Y, lanthanide series elements, and combinations thereof, $M^{4+}$ is selected from the group consisting of Si, Ge, Ti, Ir, Ru, Sn, Hf, Zr, and combinations thereof, $M^{5+}$ is selected from the group consisting of V, Nb, Ta, and combinations thereof, $0 \leq y \leq 1$, the mean ionic radius of the $M^{3+}$ cations and the mean ionic radius of the $M^{5+}$ cations are each about 0.4 to 1.00 Å when coordinated by six oxygen anions, and the mean ionic radii of the $M^{4+}$ cations and the $M^{5+}$ cations are each no greater than about $0.53+(0.30\times$the mean ionic radius of the $M^{3+}$ cations).

18. A method of claim 17 wherein the alkali metal is provided as K.

19. A method of claim 17 wherein $M^{3+}$ and $M^{4+}$ respectively are provided as oxide yielding species of metals selected from the group consisting of Y and Zr, Al and Ti, In and Zr, Ga and Ti, Ga and Ge, Fe and Ti, Cr and Ti, and Al and Si.

20. A method of claim 19 wherein $M^{3+}$ and $M^{4+}$ respectively are provided as oxide yielding species of metals selected from the group consisting of Y and Zr, In and Zr, and Al and Ti.

21. A method of claim 20 wherein raw materials are provided to yield a compound having the general formula $AYZr_2Si_2P_6O_{25}$.

22. A method of claim 21 wherein the alkali metal is provided as K.

23. A method of claim 22 wherein the alkali metal is provided as a compound selected from the group consisting of $KNO_3$ and $K_2CO_3$, the phosphate is provided as a phosphate compound selected from the group consisting of $NH_4H_2PO_4$, $(NH_4)_2HPO_4$, $(NH_4)_3PO_4 \cdot H_2O$, and combinations thereof, $M^{3+}$ is provided as $Y(NO_3)_3 \cdot 9H_2O$, and $M^{4+}$ is provided as a zirconium compound selected from the group consisting of $ZrO(NO_3)_2 \cdot nH_2O$, $ZrOCl_2 \cdot nH_2O$, and combinations thereof.

* * * * *

UNITED STATES PATENT AND TRADEMARK OFFICE
CERTIFICATE OF CORRECTION

PATENT NO. : 5,922,297
DATED : July 13, 1999
INVENTOR(S) : Merkel

Page 1 of 2

It is certified that error appears in the above-identified patent and that said Letters Patent is hereby corrected as shown below:

Column 5, line 65, $CS_2CO_3$ should be --$Cs_2CO_3$--.

Column 7, line 1, "miller" should be --milled--.

Column 11 and 12, Table 1, line 3, in column 6, "$KAlT_{12}Si_2P_6O_{25}$" should be --$KAlTi_2Si_2P_6O_{25}$--.
   in column 7, "$RbAlT_{12}Si_2P_6O_{25}$" should be --$RbAlTi_2Si_2P_6O_{25}$--.

Column 11 and 12, line 23, "$TlO_2$" should be --$TiO_2$--.

Column 11 and 12, Table 1, line 39, in column 8, "$CsAlT_{12}Si_2P_6O_{25}$" should be --$CsAlTi_2Si_2P_6O_{25}$--.
   in column 9, "$KGaT_{12}Si_2P_6O_{25}$" should be --$KGaTi_2Si_2P_6O_{25}$--.
   in column 11, "$Kfet_{12}Si_2P_6O_{25}$" should be --$KFeTi_2Si_2P_6O_{25}$--.
   in column 12, "$KCrT_{12}Si_2P_6O_{25}$" should be --$KCrTi_2Si_2P_6O_{25}$--.
   in column 14, "$KAlSi_2Si_2P_6O_{25}$" should be --$KAlSi_2Si_2P_6O_{25}$--.
   in column 15, "$KYT_{12}Si_2P_6O_{25}$" should be --$KYTi_2Si_2P_6O_{25}$--.

UNITED STATES PATENT AND TRADEMARK OFFICE
CERTIFICATE OF CORRECTION

PATENT NO. : 5,922,297
DATED : July 13, 1999
INVENTOR(S) : Merkel

It is certified that error appears in the above-identified patent and that said Letters Patent is hereby corrected as shown below:

Column 13 and 14, line 15, "TlO$_2$" should be --TiO$_2$--.

Column 13 and 14, line 15, column 8, "1.82" should be --2.82--.

Column 15 and 16, Table 3, line 19,
  in column 16, "NaAlT$_{12}$Si$_2$P$_6$O$_{25}$" should be --NaAlTi$_2$Si$_2$P$_6$O$_{25}$--.
  in column 17, "Ba$_{0.5}$AlT$_{12}$Si$_2$P$_6$O$_{25}$" should be --Ba$_{0.5}$AlTi$_2$Si$_2$P$_6$O$_{25}$--.
  in column 21, "KalZr$_2$Si$_2$P$_6$O$_{25}$" should be -- KAlZr$_2$Si$_2$P$_6$O$_{25}$--.

Column 15 and 16, Table 3, line 23 "K$_{21\ CO3}$" should be --K$_2$CO$_3$--.

Column 18, line 27, "M$^{4+}_{2=2y}$ $^{5+}_y$" should be --M$^{4+}_{2-2y}$ M$^{5+}_y$ --.

Signed and Sealed this

Twenty-fourth Day of October, 2000

Attest:

Q. TODD DICKINSON

*Attesting Officer*    *Director of Patents and Trademarks*